United States Patent [19]

Bergkvist

[11] Patent Number: 5,280,487
[45] Date of Patent: Jan. 18, 1994

[54] METHOD AND ARRANGEMENT FOR DETECTING AND LOCALIZING ERRORS OR FAULTS IN A MULTI-PLANE UNIT INCORPORATED IN A DIGITAL TIME SWITCH

[75] Inventor: Jan A. Bergkvist, Hägersten, Sweden

[73] Assignee: Telefonaktiebolaget L M Ericsson, Stockholm, Sweden

[21] Appl. No.: 963,948

[22] Filed: Oct. 19, 1992

Related U.S. Application Data

[63] Continuation of Ser. No. 537,934, Jun. 14, 1990, abandoned.

[30] Foreign Application Priority Data

Jun. 16, 1989 [SE] Sweden .................. 8902192

[51] Int. Cl.$^5$ ............................ G06F 11/08
[52] U.S. Cl. ........................ 371/36; 371/67.1; 370/112
[58] Field of Search .............. 371/36, 61, 22.4, 30, 371/56, 25.1, 68.1, 68.2, 67.1, 24, 37.7; 370/112

[56] References Cited

U.S. PATENT DOCUMENTS

| | | | |
|---|---|---|---|
| 3,768,071 | 10/1973 | Knauft et al. | 371/51.1 |
| 3,794,819 | 2/1974 | Berding | 371/51.1 |
| 4,146,749 | 3/1979 | Pepping et al. | 179/15 AT |
| 4,345,324 | 8/1982 | Smitt | 370/14 |
| 4,439,826 | 3/1984 | Lawrence et al. | 364/200 |
| 4,665,522 | 5/1987 | Lala et al. | 371/36 |
| 4,910,735 | 3/1990 | Yamashita | 371/22.4 |
| 4,912,698 | 3/1990 | Bitzinger et al. | 370/13 |
| 4,929,939 | 5/1990 | Varma et al. | 340/825.8 |

FOREIGN PATENT DOCUMENTS

| | | |
|---|---|---|
| 27992/89 | 5/1991 | Australia . |
| 0273249 | 7/1988 | European Pat. Off. . |
| 3334765 | 11/1985 | Fed. Rep. of Germany . |
| 2399162 | 2/1979 | France . |
| 60-10996 | 1/1985 | Japan . |
| 847564 | 9/1984 | South Africa . |
| 1570113 | 3/1978 | United Kingdom . |

OTHER PUBLICATIONS

Patent Abstracts of Japan, vol. 3, No. 026 (E-095), Mar. 6, 1979; JP-A-54 005 416 (Fuji Denki Seizo), Jan. 16, 1979.

Patent Abstracts of Japan, vol. 6, No. 147 (E-123), Aug. 6, 1982; JP-A-57 068 944 (Fujitsu), Apr. 27, 1982.

Philip, A. S. *A Multipurpose Digital Switching Subsystem.* International Switching Symposium, 1976.

Primary Examiner—Robert W. Beausoliel, Jr.
Assistant Examiner—Phung Chung
Attorney, Agent, or Firm—Burns, Doane, Swecker & Mathis

[57] ABSTRACT

A method and device for detecting errors in a digital time switch that does not require the signal to be synchronous throughout a multi-plane processing unit in a digital time switch. The present invention allows for the detection and localization of errors occurring in one section of one plane in a multi-plane unit. The invention is preferably included in a telecommunications system operating with pulse code modulation and time multiplex. In a multi-plane portion of a digital time switch, there is generated for each one of corresponding parallel planes at corresponding locations a compressed version of the data signal and the corresponding compressed data signals are compared. An alarm is given when the comparison shows a difference between the compressed signals.

17 Claims, 2 Drawing Sheets

METHOD AND ARRANGEMENT FOR DETECTING AND LOCALIZING ERRORS OR FAULTS IN A MULTI-PLANE UNIT INCORPORATED IN A DIGITAL TIME SWITCH

This application is a continuation of application Ser. No. 07/537,934, filed Jun. 14, 1990, now abandoned.

TECHNICAL FIELD

The present invention relates to a digital time switch, of the kind which is provided with equipment i.e., processors and related electronics, in several electrically identical parallel working planes. The digital time switch is included in a telecommunication system which operates with pulse code modulation and time multiplex. More specifically, the invention relates to a method and an arrangement for error/fault detection and error/fault localization in a multi-plane processing unit incorporated in a switch of the aforesaid kind.

BACKGROUND ART

In order to achieve a high degree of reliability in extensive telecommunication systems, it is normal for functional units in the system switch to utilize several, mutually-parallel planes, each containing mutually-identical equipment. As used throughout this application, the terms "mutually-identical" and "electrically identical" equipment mean electronic circuitry configures such that when an electrical signal is input to two or more pieces of such equipment, when functioning without error, the outputs from such equipment will be the same. The terms "equipment" and "processing means" include but are not limited to processors, memories and/or other electronic circuitry. The data-flow entering such a multi-plane unit is distributed to the parallel planes contained therein. The data-flow passes through the equipment in each of said planes and an output data signal is then delivered from respective planes. The occurrence of an error, or a fault, in any one of the planes can be discovered, by comparing the data signals delivered by the various planes, bit for bit, and a majority-selection of data-flow can be delivered from the unit by making a majority selection on the basis of said comparison. The comparison and the majority-selection are effected in a comparator/majority-selection device connected to the multi-plane unit.

As before mentioned, the comparator/majority-selection device is operative to make a comparison between the data signals exiting from the planes, bit-for-bit in real time, and delivers an output signal which constitutes a majority decision. In order for this to be possible, the output data signals must be delivered from the parallel planes synchronously, i.e. the delays through the three planes must be of mutually equal value, since otherwise the comparator/majority-selection device will produce an erroneous signal.

Swedish Patent Application SE 8705065-4 describes a time switch which is based on three synchronously operating planes and which operates with bit-for-bit comparison and majority-selection between corresponding information deriving from the three planes. The comparison and majority-selection are utilized to correct errors/faults in information occurring in any one plane in the switch. Each plane includes switch storage devices SSA, SSB, SSC, control storage devices CSA, CSB, CSC, re-write devices RWA, RWB, RWC and information selecting devices MD1A . . . MD4C. Each information selector device is operative to make a comparison between the information from the three planes and to make a majority-selection on the basis of this comparison, therewith correcting any error/fault that may occur in any one of the three planes.

Japanese Patent Specification JP 60-10996 describes a time selector which has time selecting devices in three planes. Each plane includes selector storage devices $1a$, $1b$, $1c$ and control storage devices $3a$, $3b$, $3c$. A majority-selection is made from the connection information from the three planes in a majority selector device 8 and the majority-selected connection information is delivered to the selector storage devices $1a$, $1b$, $1c$. A majority selection is made on information from the selector storage devices $1a$, $1b$, $1c$ in a majority-selection device 7, and delivered from the selector storage devices $1a$, $1b$, $1c$ on an output line 5.

British Patent Specification GB 1570 113 describes an invention relating to electronic systems which include equipment in parallel planes. The equipment operates with majority-selection, so as to obtain correct output signals even though an error/fault might occur. The object of the invention is to provide an arrangement for localizing errors/faults in the system. The error/fault localization is program-controlled and functions on the concept of testing one unit at a time. The selection information comes from a programmable read only memory (PROM). Each plane includes a device WSU for wave shape selection, these devices WSU being operative to cause the unit selected for testing to carry out a given operation so that a waveshape corresponding to said operation is formed. The generated waveshapes produced in the parallel planes in said unit are sent to a comparator CCU, in which they are compared, therewith enabling the detection of an error/fault in any one of the planes.

SUMMARY OF THE INVENTION

The present invention is a method and a device for detecting errors in a multi-plane processing unit of a digital time switch without the need to compare large quantities of data or the requirement that signals be synchronous through the digital time switch in all cases.

The multi-plane unit of the digital switch preferably comprises three electrically identical planes, i.e., triplicated equipment arranged in three planes. Each plane has a plurality of sections and each section comprise equipment that is electrically identical to equipment in corresponding sections in the other planes, i.e., equipment in the first section of plane A is electrically identical to equipment in the first section of planes B and C. Similarly, equipment in the nth section of plane A is electrically identical to equipment in nth section of planes B and C.

When data is input to the multi-plane unit of the time switch, the same data is input to each first section in each plane. Equipment, e.g., the processor, in each first section of each plane processes the data. The output from each such processor is connected to the input of the equipment in the immediately subsequent section of each respective plane. In other words, the sections in a plane are connected in series. The data continues to flow through each plane in this manner until reaching the final section. The output of the final section of each plane is input to a majority selection device. If there are no errors in the time switch, the output from each final section of each plane will be the same and the majority selection device will output the data output from the final sections. If an error has occurred in the time switch, the majority selection device will compare the outputs from the final sections of the three planes, and if two of the three outputs are the same, will output that data.

Each section in each plane also contains a data signal compressor which may be connected either to the input or the output of the equipment, e.g., the processor, in the section. Compressed data signals ar generated over certain time intervals. For example, if the data flowing through the time switch has a frame format or similar configuration, an appropriate time interval would be one compression per frame. The compressed data signal in corresponding sections is compared. If the switch does not experience an error, the compressed data from corresponding sections in each plane will be the same and when this compressed data is compared, the comparator will not indicate an alarm. When a difference is detected between the compressed data signals in corresponding sections, the comparator comparing the compressed data signals will indicate an error in those sections.

Because compressed signals are used for comparison rather than basing the comparison on the whole of the data flow through the switch, neither the signal flowing through the switch nor the processors are affected by the error detecting of the present invention.

DETAILED DESCRIPTION OF THE PREFERRED EMBODIMENTS

Figure 1:
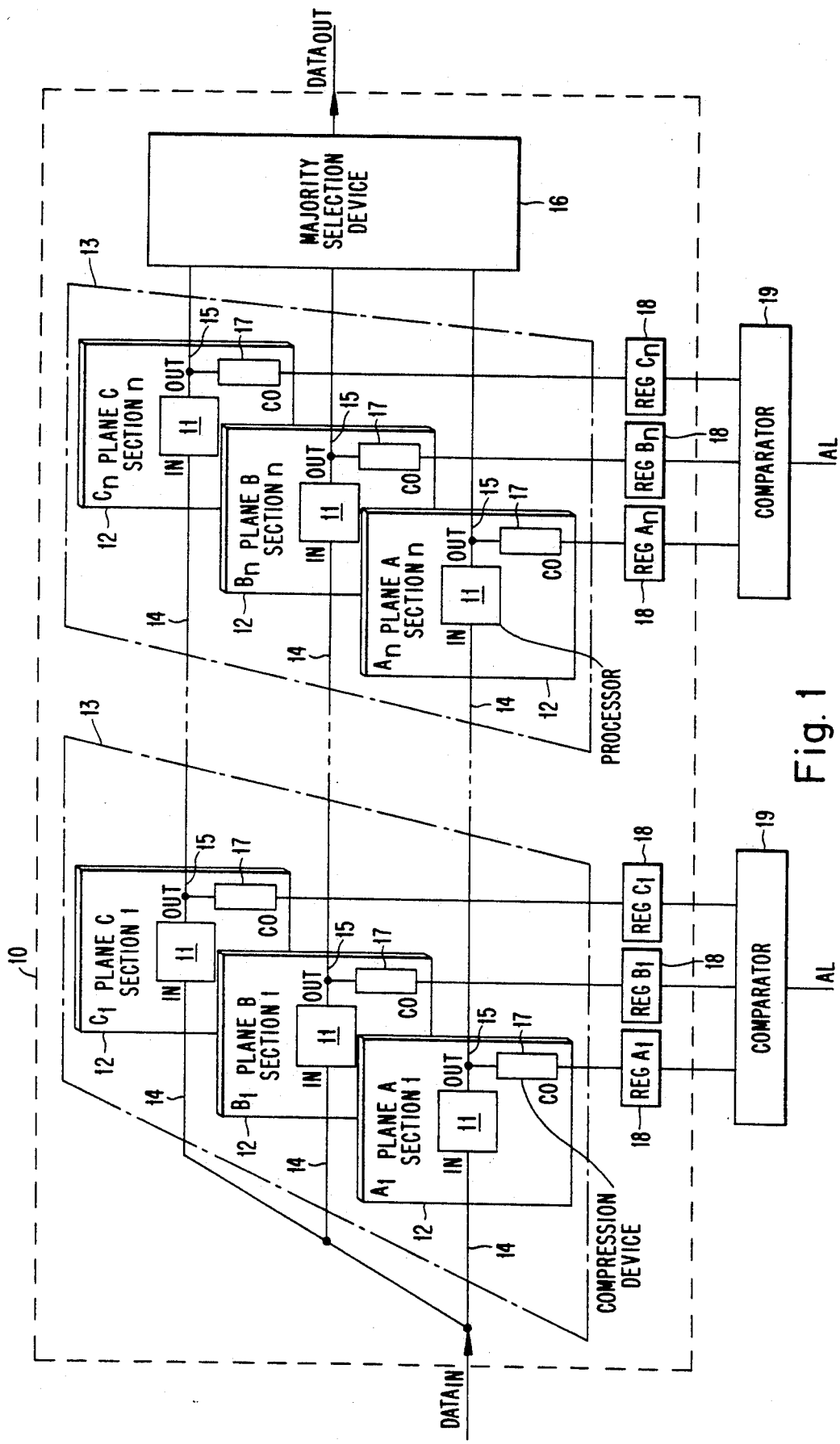
FIG. 1 is a block schematic of a multi-plane processing unit having a plurality of sections incorporated in a digital time switch in accordance with the present invention.

A multi-plane unit utilizes a comparator/majority-selection device for delivering a correct output data signal from the multi-plane unit. It is therefore important that a certain error/fault will not occur simultaneously in two or more of the planes, since the majority-selection device would otherwise deliver an erroneous output data signal. Consequently, if a first error/fault occurs in one of the planes, it is necessary to remedy this error/fault as quickly as possible, in order to avoid the risk of the same error/fault occurring in a parallel plane before the first error/fault is remedied.

Accordingly, the object of the present invention provides a method and an arrangement by means of which an error/fault occurring in one plane in a multi-plane unit can be detected and the faulty equipment accurately localized.

Application of the method described in Swedish Patent Application SE 8705065-4 employing bit-for-bit comparison between corresponding information originating from parallel planes for the purpose of solving the aforedescribed technical problem places high demands on synchronism in the multi-plane unit and also requires large quantities of data to be processed, particularly when the system operates with high bit-speeds and when comparisons are effected at many locations in the planes. When using an arrangement according to the Swedish patent application, it is necessary for the data-flow through the multi-plane unit to be synchronous at all of the locations at which comparisons are made, since the comparisons are made bit-for-bit on the whole of the data-flow. In the case of high-speed data-flow, such comparison becomes complicated and therewith expensive.

The British Patent GB 1 570 113 attempts to solve the aforesaid problem by localizing errors/faults in a system which utilizes equipment in several parallel planes. The drawback with this method is that a large amount of equipment is required, since error/fault localization is program controlled and since the localization of errors/faults does not utilize the through-passing data-flow.

The present invention is characterized by the features set forth in the following claims, and in brief, comprises the step of generating in a multi-plane unit having sections of equipment in three parallel working planes, for each of corresponding parallel sections at corresponding locations, a compressed version of the data signal entering the section and/or of the data signal exiting from said section. Corresponding compressed data-signals are then compared, and an alarm is given when the comparison shows that the compared, compressed data signals differ from one another. The compressed data signals are generated over given time intervals. If the data-flow through the multi-plane unit has a frame-format of some configuration or other, an appropriate time interval in this regard is one compression per frame.

The inventive method and arrangement results in a reduction in the quantity of data handled during the comparison process, since the comparison is made on the basis of compressed signals instead of on the basis of the whole of the data-flow. Because the comparison material has been made much smaller, there is less need for the comparison to manage large quantities of data.

The requirement for the signals through the multi-plane unit to be synchronous, is limited to those signals which are delivered to the comparator/majority-section device from the last section in each of said planes. In other respects, the data signals through the unit need not be synchronous, since comparisons are made between compressed versions of the data-flow. On the other hand, comparisons must, of course, be made between compressed signals which derive from one and the same time interval or one and the same frame of the through-passing data-flow.

Since the compressed signals include a smaller quantity of information per frame than the original signals, the comparison can be made under relatively quiet conditions, which means that the comparison need not be made in the immediate physical vicinity of each section, but can be carried out centrally, and also enables several section units to utilize one and the same time-shared comparator. A section unit includes corresponding parallel sections having mutually identical equipment.

FIG. 1 is a block schematic of a multi-plane unit 10 incorporated in a digital time switch. The multi-plane unit 10 has three parallel working planes A, B, C each provided with mutually identical equipment 11. The equipment 11 in each of the planes A, B, C is divided into sections, and the planes are also divided into sections in a corresponding manner. The plane A is divided into n number of sections 12, designated $A_1, A_2, \ldots, A_n$. The remaining planes B, C are divided correspondingly into sections 12, designated $B_1, B_2, \ldots, B_n$ and $C_1, C_2, \ldots, C_n$. Corresponding parallel sections 12 in the three parallel working planes, for instance the sections $A_1, B_1, C_1$, contain mutually identical equipment 11 and form a section unit 13. The equipment incorporated in the section units may, for instance, have the form of different types of data storage devices. The first section unit 13 includes the sections $A_1$, $B_1$, $C_1$, the second section unit (not shown in the FIGURE) includes the sections $A_2$, $B_2$, $C_2$, and so on. The equipment 11 associated with the plane A is connected together by data lines 14 entering the sections $A_1$, $A_2$, . . . , $A_n$ of the plane and by data lines 15 exiting from said plane sections. The equipment associated with the plane B and the equipment associated with the plane C are respectively connected in a corresponding manner.

Data-flow $DATA_{in}$ entering the multi-plane unit 10 is distributed to the parallel sections $A_1$, $B_1$, $C_1$ in the first section unit 13. The equipment 11 in each of the sections $A_1$, $B_1$, $C_1$ therewith receives an incoming data signal IN on the data input line 14 of each section. The incoming data signals IN in the first section unit 13 thus correspond to the data-flow DATAin entering the multi-plane unit 10. The equipment 11 in each of the sections $A_1$, $B_1$, $C_1$ in the first section unit processes the incoming data signal IN, whereafter said equipment 11 delivers an outgoing data signal OUT on the section-output data line 15.

The data output signals OUT are conveyed further to the next section unit 13 and, prior to having passed through the equipment of said second unit, constitute incoming data signals IN. Incoming data signals IN and outgoing data signals OUT pass through the equipment in remaining section units 13 in a similar manner, wherein said data signals constitute a data-flow which passes through the multi-plane unit. When the through-passing data-flow has passed the equipment 11 in the last section unit 13 in line, the output data signals OUT are transmitted from said last unit to a comparitor/-majority selection device 16. The signals entering the device 16 are compared bit-for-bit and are majority selected, and a majority-selected output data-flow $DATA_{out}$ is delivered from the multi-plane unit 10.

In order to enable an error/fault in the unit 10 to be detected and localized accurately, each section 12 includes a compression device 17 connected to the output data line 15 of the section 12. The compression device 17 is operative to generate a compressed version of the output data signal OUT without influencing said signal. This signal generation results in a compressed data signal CO. If the data-flow in the multi-plane unit 10 is divided into frames, a compressed signal CO will be conveniently formed for each frame information in the output data signals OUT. It is also possible to form the compressed signal CO from information in some other interval. Each of the compression devices 17 is connected to a register 18 in which a compressed signal CO can be temporarily stored. The register 18 also contains information relating to the frame from which the compressed signal CO originated. The registers 18 corresponding to sections $A_1$, $B_1$, $C_1$ in the first section unit 13 are designated Reg $A_1$, Reg $B_1$, Reg $C_1$ illustrated in FIG. 1. The registers 18 connected to remaining sections are designated in a corresponding manner. In order to enable errors/faults to be localized, a comparitor 19 is connected to the registers 18 associated with one and the same section unit, so as to compare compressed signals CO from corresponding sections 12. A comparitor 19 is therefore connected to the registers 18 designated Reg $A_1$, Reg $B_1$, Reg $C_1$, and a further comparitor 19 is connected to registers 18 designated $Reg_{An}$, $Reg_{Bn}$, $Reg_{Cn}$, and so on. The comparison entails comparing compressed signals CO which have their origin in output data signals OUT from one and the same frame, wherein the compared signals derive from one and the same data quantity. When the compared compressed-signals CO are identical, no error and/or fault is detected, but if one of the compared compressed-signals CO differs from the other two in some way or another, this will indicate a fault or error in the equipment 11 in the section 12 from which the deviating signal was delivered, which results in the issue of an alarm signal AL by the comparitor 19.

The aforesaid generation of compressed signals CO may be effected, for instance, in accordance with the Cyclic Redundancy Check (CRC) principle, in which case the compression device 17 includes shift registers and exclusive-or-gates. Depending on the frame-size of the through put data-flow and the desired probability of error/fault discovery, there is selected an appropriate compression algorithm which decides how shift registers and exclusive-orgates shall be arranged in the compression devices 17. When a compression device 17 has received information from a frame in the output data signal OUT, the shift registers will obtain a reduced quantity of information, i.e. a reduced number of bits in relation to the number of bits in a frame. The reduced quantity of information is delivered from the shift register of the compression device 17 to the register 18 in the form of a compressed signal CO. As before described, a comparison is then made between the information contained in three registers 18 associated with sections 12 of one and the same section unit 13, this comparison being made in the comparator 19 connected to said section unit. One comparison at a time compares corresponding bits from the three registers 18. If one of the compared bits differs from the two remaining bits, the aforesaid alarm signal AL is given, this signal also indicating the parallel section from which the deviating bit arrived. The equipment in the faulty section can therewith be replaced.

The aforedescribed procedure enables errors/faults to be detected in a multi-plane unit, both with respect to single intermittent errors/faults and with respect to a continuous error/fault state. A deviation in any one of the sections results, with desired probability, in the compressed version of the output data signal of the faulty section to deviate from the other output data signals.

It is not necessary to generate the compressed signal CO at that location in the section at which the output data signal OUT is transported, since the signal can also be generated at other locations in said section. The main criterion is that the compressed version is generated at corresponding locations in sections associated with one and the same section unit, so that the data quantity from which the compared compressed signals CO originate is one and the same. For instance, it is possible instead to generate, for each section, a compressed version of the incoming data signal IN and to effect a comparison in the aforedescribed manner, wherein a detected error/-fault indicates a fault in the preceding section unit. Alternatively, there may be generated for each section both a compressed version of the incoming data signal IN and a compressed version of the outgoing data signal OUT, so as to detect both error/fault in the equipment and in the data transmission between two section units.

Since the compressed signals CO, for each frame, include a smaller quantity of information than the original signals, the comparisons can be made under relatively quiet conditions, therewith enabling the comparisons to be made centrally and remote from the immediate physical vicinity of the sections. This also enables a time-shared comparitor to be used in common by several section units.

Figure 2:
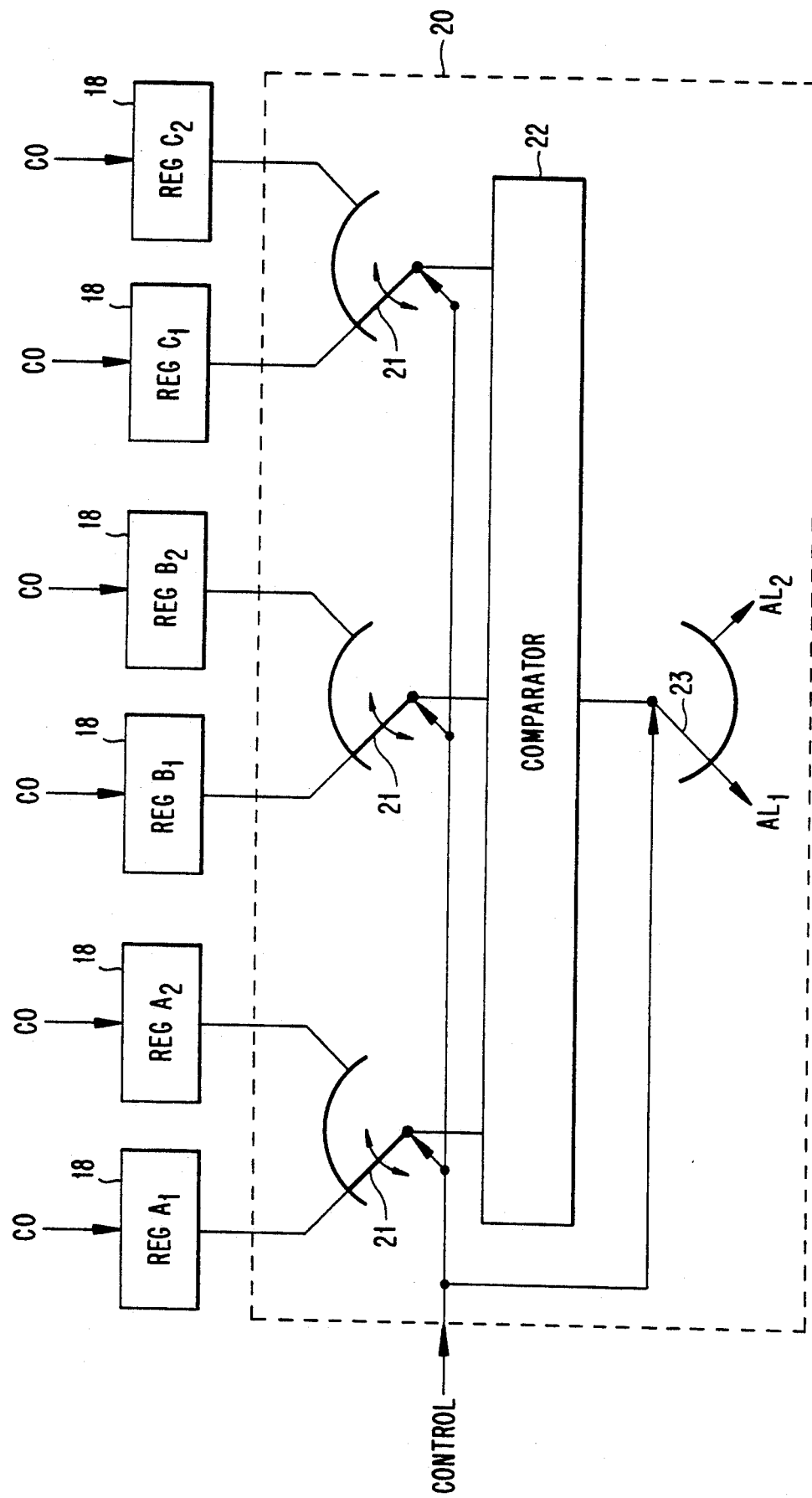
FIG. 2 shows a time-shared comparator in accordance with the present invention.

FIG. 2 illustrates a time-shared comparator 20 which is operative to carry-out comparisons on compressed signals CO from the first section unit, these signals being stored intermediately in registers 18 designated Reg $A_1$, Reg $B_1$, Reg $C_1$, and also to carry-out comparisons on compressed signals CO from the second section unit, these signals being stored intermediately in the registers 18 designated Reg $A_2$, Reg $B_2$, Reg $C_2$. The comparison carried-out on the signals from the two section units is effected i.e. implemented, alternately under the control of a control signal CONTROL, wherein a comparison is made on the signals from both the first and the second section units during the period of one frame. The control signal CONTROL therewith controls three register switches 21 in a manner such that the registers Reg $A_1$, Reg $B_1$, Reg $C_1$ of the first section unit are connected to a comparator 22 during a first part of a frame. During this first part of said frame, the control signal CONTROL is also operative to control an alarm switch 23 in a manner to cause an alarm signal $AL_1$ associated with the first section unit to be given if an error/fault is detected during said comparison. During a second part of said frame, the control signal CONTROL is operative to control said register switch 21 in a manner to connect the registers Reg $A_2$, Reg $B_2$, Reg $C_2$ of the second section unit to the comparator 22 instead. During this second part of the frame, the alarm switch 23 is controlled so that an alarm signal $AL_2$ associated with the second section unit is given when an error/fault is detected.

I claim:

1. A method of detecting errors in a digital time switch comprising the steps of:
    providing electrical input signals to said time switch, said time switch comprising
        three electrically identical planes each having at least a first section of electrical circuitry and final section of electrical circuitry, each section having an input and an output, each section being connected in series within each plane, and each section being electrically identical to corresponding sections in the other planes;
    processing a data signal in corresponding sections of each plane and generating a processed data signal for each data signal;
    compressing each processed data signal in corresponding sections of each plane and generating a compressed data signal for each processed data signal;
    comparing said compressed data signals from corresponding sections and generating an alarm when a difference is detected.

2. The method of claim 1 further comprising the step of generating a prepared data signal representing a majority of the processed data signals from each final section.

3. The method of claim 1 wherein said data signal is divided in frames and said compressing and comparing steps are implemented framewise.

4. The method of claim 1 wherein said step of compressing comprises the substep of generating said compressed data signals from said processed data signals in accordance with a Cyclic Redundancy Check principle.

5. The method of claim 1 wherein said compressing step does not affect said processing step.

6. A method of detecting errors in a digital time switch comprising the steps of:
    providing electrical input signals to said time switch, said time switch comprising
        three electrically identical planes each having at least a first section of electrical circuitry and a final section of electrical circuitry, each section having an input and an output, each section being connected in series within each plane, and each section being electrically identical to corresponding sections in the other planes;
    processing a data signal in corresponding sections of each plane and generating a processed data signal for each data signal;
    compressing each data signal in corresponding section of each plane and generating a compressed data signal for each data signal; and
    comparing said compressed data signals in corresponding sections and generating an alarm when a difference is detected.

7. The method of claim 6 further comprising the step of generating a prepared data signal representing a majority of the processed data signals from each final section.

8. The method of claim 6 wherein said data signal is divided in frames and said compressing and comparing steps ar implemented framewise.

9. The method of claim 6 wherein said step of compressing comprises the substep of generating said compressed data signals from said data signals in accordance with a Cyclic Redundancy Check principle.

10. The method of claim 6 wherein said compressing step does not affect said processing step.

11. An error detector in a digital time switch comprising:
    three electrically identical planes, each plane comprising at least a first section of electrical circuitry and a final section of electrical circuitry, each section having an input and an output, each section being connected in series within each plane, and each section being electrically identical to corresponding sections in other planes, each section comprising
        mans for processing data signals, having an input for a data signal and an output for a processed data signal,
        means for compressing data signals, having an input for the processed data signal and an output for a compressed data signal, said compressing means input being connected to said processing means output;
        means, connected to said compressing means output, for comparing output signals from compressing means in corresponding sections and detecting differences between the compared output signals.

12. The error detector of claim 11 further comprising a majority selector, connected to the processing means output of each final section, for comparing output signals from said final section processing means and generating a signal representing a majority of the compared processing means output signals.

13. The error detector of claim 11 wherein in each section the compressing means framewise compresses the processing means output signal, and each comparator means framewise compares compressing means output signals originating from the same data signal.

14. The error detector of claim 11 wherein said comparator means further comprises a time-shared comparator alternately connected to the compressing means outputs of two different sections.

15. The error detector of claim 11 wherein in each section, said compressing means does not affect said processing means.

16. The error detector of claim 11 further comprising an indicator electrically connected to said comparing means to indicate when a difference is detected between the compared output signals.

17. An error detector in a digital time switch comprising:

three electrically identical planes, each plane comprising at least a first section of electrical circuitry and a final section of electrical circuitry, each section having an input and an output, each section being connected in series within each plane, and each section being electrically identical to corresponding sections in other planes, each section comprising means for processing data signals, having an input for a data signal and an output for a processed data signal, means for compressing data signals, having an input for the data signal and an output for a compressed data signal, said compressing means input being connected to said processing means input;

means, connected to said compressing means output, for comparing output signals from compressing means in corresponding sections and detecting differences between the compared output signals.

* * * * *